US011998830B2

(12) United States Patent
Ko et al.

(10) Patent No.: US 11,998,830 B2
(45) Date of Patent: Jun. 4, 2024

(54) SWIMMING TIMER

(71) Applicants: Wen-Shen Ko, Taipei (TW); Chih-Han Ko, Taipei (TW); Wang-Hsiang Ko, Taipei (TW)

(72) Inventors: Wen-Shen Ko, Taipei (TW); Chih-Han Ko, Taipei (TW); Wang-Hsiang Ko, Taipei (TW)

( * ) Notice: Subject to any disclaimer, the term of this patent is extended or adjusted under 35 U.S.C. 154(b) by 693 days.

(21) Appl. No.: 17/176,695

(22) Filed: Feb. 16, 2021

(65) Prior Publication Data

US 2022/0040554 A1 Feb. 10, 2022

(30) Foreign Application Priority Data

Aug. 10, 2020 (TW) ................................ 109127085

(51) Int. Cl.
*A63B 71/06* (2006.01)
*G04F 8/08* (2006.01)
*G07C 1/24* (2006.01)

(52) U.S. Cl.
CPC ............ *A63B 71/0686* (2013.01); *G04F 8/08* (2013.01); *G07C 1/24* (2013.01); *A63B 2071/0688* (2013.01); *A63B 2244/20* (2013.01)

(58) Field of Classification Search
CPC ........ A63B 71/0686; A63B 2071/0688; A63B 2244/20; A63B 69/12; G04F 8/08; G07C 1/24
See application file for complete search history.

(56) References Cited

U.S. PATENT DOCUMENTS 5,977,493 A * 11/1999 Tanaka .................. H01H 3/141 200/85 R
6,156,987 A * 12/2000 Warne ................ A63B 71/0605 200/512
2005/0243651 A1* 11/2005 Balley .................... A63B 69/12 368/110
2010/0304934 A1* 12/2010 Woodson ........... A63B 24/0062 482/8
2016/0375342 A1* 12/2016 Oberhelman ...... A63B 71/0686 700/92

* cited by examiner

*Primary Examiner* — Edwin A. Leon
*Assistant Examiner* — Kevin Andrew Johnston
(74) *Attorney, Agent, or Firm* — MUNCY, GEISSLER, OLDS & LOWE, P.C.

(57) ABSTRACT

A swimming timer including a fluid container, a fluid channel, a fluid sensor, a control circuit board and a display device. The fluid channel is connected to the fluid container and the fluid sensor, and the control circuit board is wired with the fluid sensor and the display device. The fluid container is installed and mounted on a side-wall of a swimming lane. When a swimmer starts, turns and stops, the fluid container will be touched and compressed forcing the fluid inside to flow into the fluid channel. The fluid sensor detects the fluid flow and generates electronic signals accordingly for the control circuit board and the built-in timing and stopwatch program to use as the input commands of start, lap and stop to compute the swimming time and the number of swimming laps. The display device is to show the results for the swimmer reference.

10 Claims, 3 Drawing Sheets

SWIMMING TIMER

BACKGROUND OF THE INVENTION a) Field of the Invention

The present invention relates to a swimming timer, and more particularly to an apparatus able to be installed in a swimming pool to carry out the functions of a stopwatch. The swimming timer issued to count the number of swimming laps and to measure the elapsed time of a full course and every individual lap when a swimmer is doing a training practice of swimming.

b) Description of the Prior Art

Swimming is a very important sport category in the international sport games, and is helpful for a swimmer to gain benefits such as enhancing physical power, improving physique and maintaining health. Therefore, many people swim frequently. In a swimming practice, a swimmer usually measures and records the elapsed time of a full course and every individual lap and the number of swimming laps in order to compute the swimming speed and to set up goals of continuous training accordingly.

A conventional timer used in swimming contests has an electromagnetic touch pad made of plural mechanical spring switches assembled in a matrix arrangement, applying the principle of electromagnetic induction. The installation and the setting of the equipment are very complicated that the operation and the calibration must be executed by specialized technicians. Since the costs of the operation and the maintenance are extremely high, this kind of timers are usually used in formal and professional swimming contests and cannot be used widely in a daily training course of an ordinary swimmer. On the other hand, a popular wearable sport watch is multifunctional and has a relatively fair price. However, to operate the wearable sport watch will distract the swimmer. In addition, taking a wearable sport watch in a swimming pool may cause injury to other swimmers, this kind of wearable sport watches are prohibited by the regulations of most swimming pools, and can only be used in outdoor water activities.

Therefore, the abovementioned products still have many shortcomings, and further improvements are required.

SUMMARY OF THE INVENTION

The inventor is devoted to swimming for many years, and is experienced in the development and the manufacture of mechanical and electrical products. To improve the abovementioned shortcomings of the prior art, the present invention with practicality is provided after careful design and evaluation.

The object of the present invention is to provide a swimming timer able to be applied easily in a swimming pool. The main working principle is to take the electronic signals generated by a fluid sensor, caused by the movements of a swimmer, as the commands of start, lap and stop in the timing functions of a stopwatch. Since the structure of the present invention is simple which can be easily setup and installed, the costs of the operation and the maintenance are low. In addition, it is not necessary to have specialized technicians to operate and to calibrate the invented swimming timer, it can be widely used in all kinds of swimming pools for ordinary swimmers in regular training courses.

The swimming timer disclosed by the present invention contains mainly a fluid container, a fluid sensor, a fluid channel, a control circuit board and a display device. The fluid container holds a Newtonian fluid (such as water or air) inside, and a fluid hole is opened at the top end of the fluid container to connect the fluid container with one end of the fluid channel. When the fluid container is touched and pressed to cause deformation, the volume of the fluid container will change, forcing the Newtonian fluid inside to flow toward and through the fluid hole into the fluid channel. The fluid sensor is connected to the other end of the fluid channel, and is connected electrically with the control circuit board. When the fluid sensor detects the flow of the Newtonian fluid in the fluid channel from the fluid container, electronic signals will be generated and transmitted to the control circuit board. The control circuit board is provided with a central processing unit, a memory unit and plural I/O (Input/Output) units, capable of controlling and driving the operations of the fluid sensor and the display device connected electrically to the control circuit board. In addition, a timing and stopwatch program is installed in the control circuit board. The timing and stopwatch program receives the electronic signals from the fluid sensor, and processes the electronic signals to produce the command data of start, lap and stop required to execute the timing and stopwatch program to compute the swimming time of the full course and every lap and to count the number of swimming laps. The display device is connected electrically to the control circuit board, allowing the timing and stopwatch program running in the control circuit board to output and display the produced results of the swimming time and the number of swimming laps.

Accordingly, the fluid container can be installed on the two side-walls of a lane in a swimming pool. When a swimmer starts (push off), turns (touch and push off) and stops (touch) a swimming course in a training practice, the fluid container will be compressed and deformed, allowing the Newtonian fluid (water or air) inside the fluid container to flow into the fluid channel. Once the fluid sensor detects the flow of the Newtonian fluid in the fluid channel, electronic signals will be generated and transmits to the control circuit board. The electronic signals are used as the input commands to the timing and stopwatch program running in the control circuit board to compute the swimming time of the full course and every lap and to count the number of swimming laps. The produced results will be transmitted to the display device for the swimmer to read. Therefore, the swimmer can collect statistically and examine carefully the swimming time and the number of swimming laps to understand the swimming speed and performance, thereby to design better training courses for improvement.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
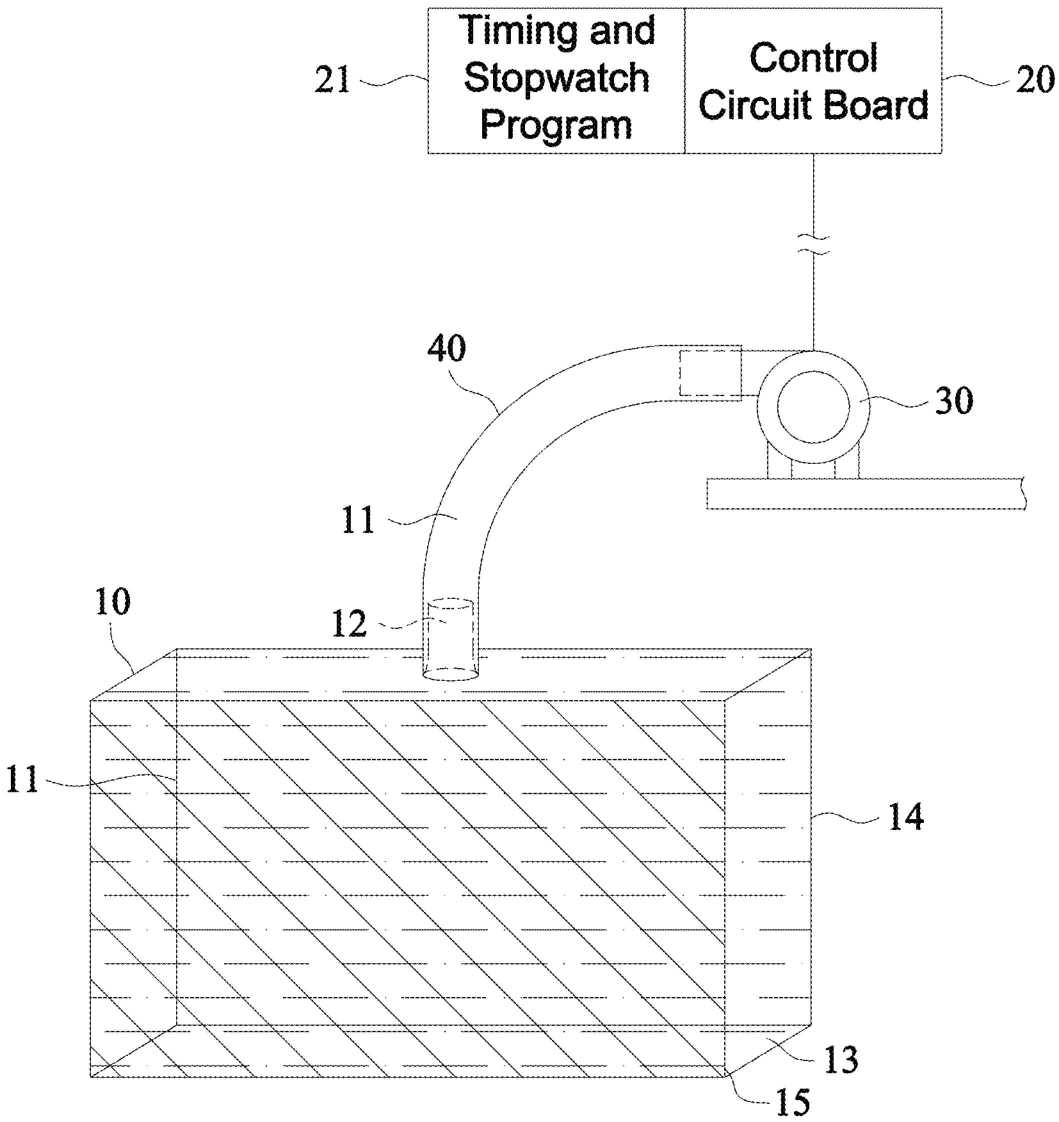
FIG. 1 shows an external and structural view of the swimming timer of the present invention.
Figure 2:
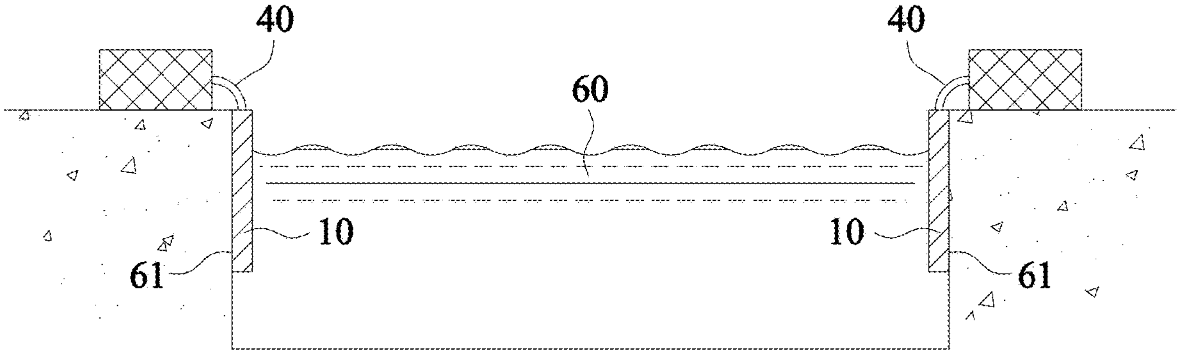
FIG. 2 shows a schematic view of the swimming timer installed in a swimming pool, according to the present invention.
Figure 3:
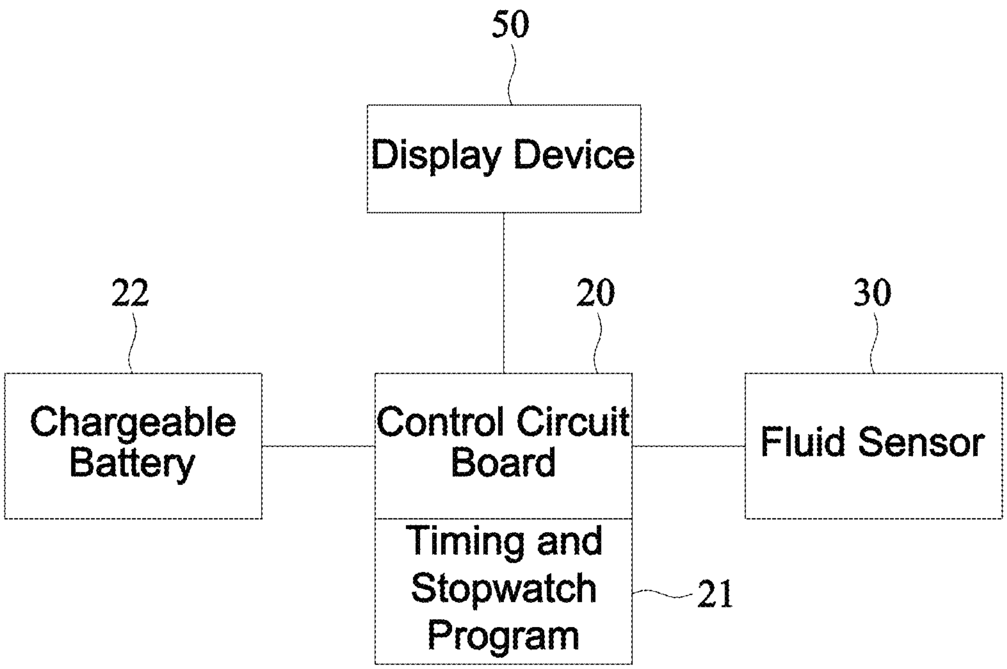
FIG. 3 shows a functional block diagram of the swimming timer of the present invention.

Referring to FIGS. 1, 2 and 3, the present invention discloses a swimming timer, comprising mainly a fluid container 10, a control circuit board 20, a fluid sensor 30, a fluid channel 40 and a display device 50.

The fluid container 10 is a cubic vessel, and its width, height and thickness comply with the FINA (Federation Internationale de Natation) regulations of the size of the touch pad of a swimming timer. The fluid container 10 is formed by a structure frame 13, a structure back panel 14 and a front touch panel 15. The structure frame 13 and the structure back panel 14 are rigid bodies to construct the rigidity of the fluid container 10. The front touch panel 15 is a plastic or metal plate with elasticity. When a force is placed on the front touch panel 15, the volume of the fluid container 10 will decrease, whereas the fluid container 10 will restore to its original volume when the placed force is released.

The fluid container 10 holds a Newtonian fluid 11 (such as water or air) inside. A fluid hole 12 is opened at the top end of the fluid container 10 and is connected to one end of the fluid channel 40. When the front touch panel 15 of the fluid container 10 is placed a force to cause deformation, the volume of the fluid container 10 will decrease to force the Newtonian fluid 11 inside the fluid container 10 to flow toward and through the fluid hole 12 into the fluid channel 40.

The fluid sensor 30 is connected to the other end of the fluid channel 40 and is connected electrically with the control circuit board 20. The fluid sensor 30 can detect the flow of the Newtonian fluid 11 in the fluid channel 40 to generate electronic signals accordingly, and to transmit the electronic signals to the control circuit board 20 for further processing.

The control circuit board 20 is provided with a central processing unit, a memory unit and plural I/O units. The control circuit board 20 is able to control the operations of the fluid sensor 30, the display device 50 and all driving circuits connected electrically with the control circuit board 20. In addition, the control circuit board 20 is installed with a timing and stopwatch program 21. The control circuit board 20 receives the electronic signals generated by the fluid sensor 30, and the timing and stopwatch program 21 takes the electronic signals as the input command data of start, lap and stop required to compute the swimming time of the full course and every lap and to count the number of swimming laps.

The display device 50 is connected electrically with the control circuit board 20. The control circuit board 20 transmits the results of the swimming time and the number of swimming laps produced by the timing and stopwatch program 21 to the display device 50 for the swimmer to read.

By the abovementioned construction of the swimming timer, the fluid container 10 can be installed on t a side-wall 61 of a lane in a swimming pool 60, and the top edge of the structure frame 13 is made to align with the top edge of the side-wall 61 of the lane. In addition, the structure back panel 14 is fixed flat on the side-wall 61 of the lane, and the front touch panel 15 faces toward the lane and the swimmer. In a swimming course, when the swimmer starts (push off), turns (touch and push off) and stops (touch), the swimmer will place a force on the front touch panel 15 to cause deformation of the front touch panel 15. The volume of the fluid container 10 will decrease, allowing the Newtonian fluid 11 held in the fluid container 10 to flow into the fluid channel 40 through the fluid hole 12. Once the fluid sensor 30 detects the flow of the Newtonian fluid 11 in the fluid channel 40, electronic signals will be generated accordingly. The control circuit board 20 receives the electronic signals and uses the electronic signals as the input command data of start, lap and stop required by the built-in timing and stopwatch program 21 to compute the swimming time of the full course and every lap and to count the number of swimming laps. Then, the produced results of the swimming time and the number of laps are transmitted to the display device 50 for the swimmer to read. The swimmer can collect statistically the swimming time and the number of swimming laps to understand the swimming speed and performance.

Referring to FIGS. 1, 2 and 3, the control circuit board 20 is connected electrically with a chargeable battery 22 to supply electricity to the control circuit board 20.

Referring to FIGS. 1, 2 and 3 again, the fluid sensor 30 can be a fluid pressure sensor to measure the fluid pressure continuously. The fluid pressure sensor is able to measure the initial pressure value of the Newtonian fluid 11 in the fluid container 10 and the fluid channel 40 at the initial state. The increase of the pressure value of the Newtonian fluid 11 relative to the initial pressure value due to the volume decrease of the fluid container 10 caused by the touch force of the swimmer can be measured. The restoration to the initial pressure value of the Newtonian fluid 11 can also be measured, when the swimmer releases the touch force and the fluid container 10 restores to its initial volume by the elasticity of the front touch panel 15.

Referring to FIGS. 1, 2 and 3 again, the fluid sensor 30 can be a fluid flow-rate sensor to measure the flow rate of the fluid continuously. The fluid flow-rate sensor is able to measure the flow rate of the Newtonian fluid 11 in the fluid channel 40 flowing from the fluid container 10, when the volume of the fluid container 10 decreases caused by the touch force of the swimmer. In addition, the reverse flow rate of the Newtonian fluid 11 in the fluid channel 40 flowing back to the fluid container 10 can also be measured, when the fluid container 10 restores to its original volume by the elasticity of the front touch panel 15 as the swimmer releases the touch force.

Referring to FIGS. 1, 2 and 3 again, the display device 50 is a screen of a cell phone or a computer.

The swimming timer of the present invention has the following advantages comparing with the prior art:

1. As the fluid sensor is used, the costs of construction and maintenance are low that the present invention can be applied widely to daily swimming training for a group or an individual.
2. The wiring layout is simple and the installation is easy that it is not necessary to set up and calibrate by professional technicians in every use.
3. The safety of use is superior. As the electric parts are installed on a far end outside the swimming pool, and only the mechanical parts are submerged in the pool water, there is no risk of electric shock to the swimmer.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A swimming timer, comprising:

a fluid container holding a Newtonian fluid fully inside with a fluid hole opened at the top end of the fluid container so that the Newtonian fluid is able to flow toward and through the fluid hole when the fluid container is touched to cause deformation, compression and volume decrease;

a fluid channel with one end connected to the fluid hole of the fluid container to receive the flow out of the Newtonian fluid when the fluid container is touched to cause deformation, compression and volume decrease;

a fluid sensor connected to the other end of the fluid channel to detect the flow of the Newtonian fluid in the fluid channel continuously and to generate electronic signals accordingly; a control circuit board providing with a central processing unit, a memory unit and plural Input and Output units that the control circuit board is connected electrically with the fluid sensor and a display device, and is built-in with drivers to operate the fluid sensor and the display device; and a display device connected electrically to the control circuit board to receive and display the computation results of the control circuit board;

the fluid container mounted and equipped on two side-walls of a lane in a swimming pool so that a swimmer starts, turns around and reaches the end to touch and compress the fluid container will cause the Newtonian fluid in the fluid container to flow through the fluid holes into the fluid channels allowing the fluid sensors to detect the flow of the Newtonian fluid in the fluid channels.

2. The swimming timer according to claim 1, wherein the fluid container is a cubic vessel, and the width, the height and the thickness of the cubic vessel comply with the FINA (Fédération Internationale de Natation) regulations of the size of touch pad of a swimming timer.

3. The swimming timer according to claim 2, wherein the fluid container is formed by a structure frame, a structure back panel and a front touch panel that the structure frame and the structure back panel are rigid bodies to construct the rigidity of the fluid container and the front touch panel is an elastic plastic or metal plate so that a touch force activated by a swimmer will cause deformation of the front touch panel and volume decrease of the fluid container and that the fluid container will restore to its initial volume due to the elasticity when the touch force released.

4. The swimming timer according to claim 2, wherein the Newtonian fluid in the fluid container is water or air.

5. The swimming timer according to claim 1, wherein the fluid channel is an airtight tube full of the Newtonian fluid that one end of the fluid channel connected with the fluid sensor and the other end of the fluid channel connected with the fluid hole of the fluid container.

6. The swimming timer according to claim 1, wherein a timing and stopwatch program is installed in the control circuit board to receive the electronic signals generated by the fluid sensor as the input command data of start, lap and stop required by the timing and stopwatch program to compute the swimming time and the number of swimming laps.

7. The swimming timer according to claim 1, wherein the control circuit board is connected electrically with a chargeable battery supplying electricity to the control circuit board to drive the fluid sensor, to receive the electronic signals generated by the fluid sensor, to execute the timing and stopwatch program, and to transmit the results of execution to the display device.

8. The swimming timer according to claim 1, wherein the fluid sensor is a fluid pressure sensor able to measure the pressure of fluid.

9. The swimming timer according to claim 1, wherein the fluid sensor is a fluid flow-rate sensor able to measure the flow rate of fluid.

10. The swimming timer according to claim 1, wherein the display device is the display screen of a cell phone or a computer.

* * * * *